Feb. 28, 1939.  H. E. WANER  2,149,199
TUBULAR RIVET
Filed Aug. 13, 1936
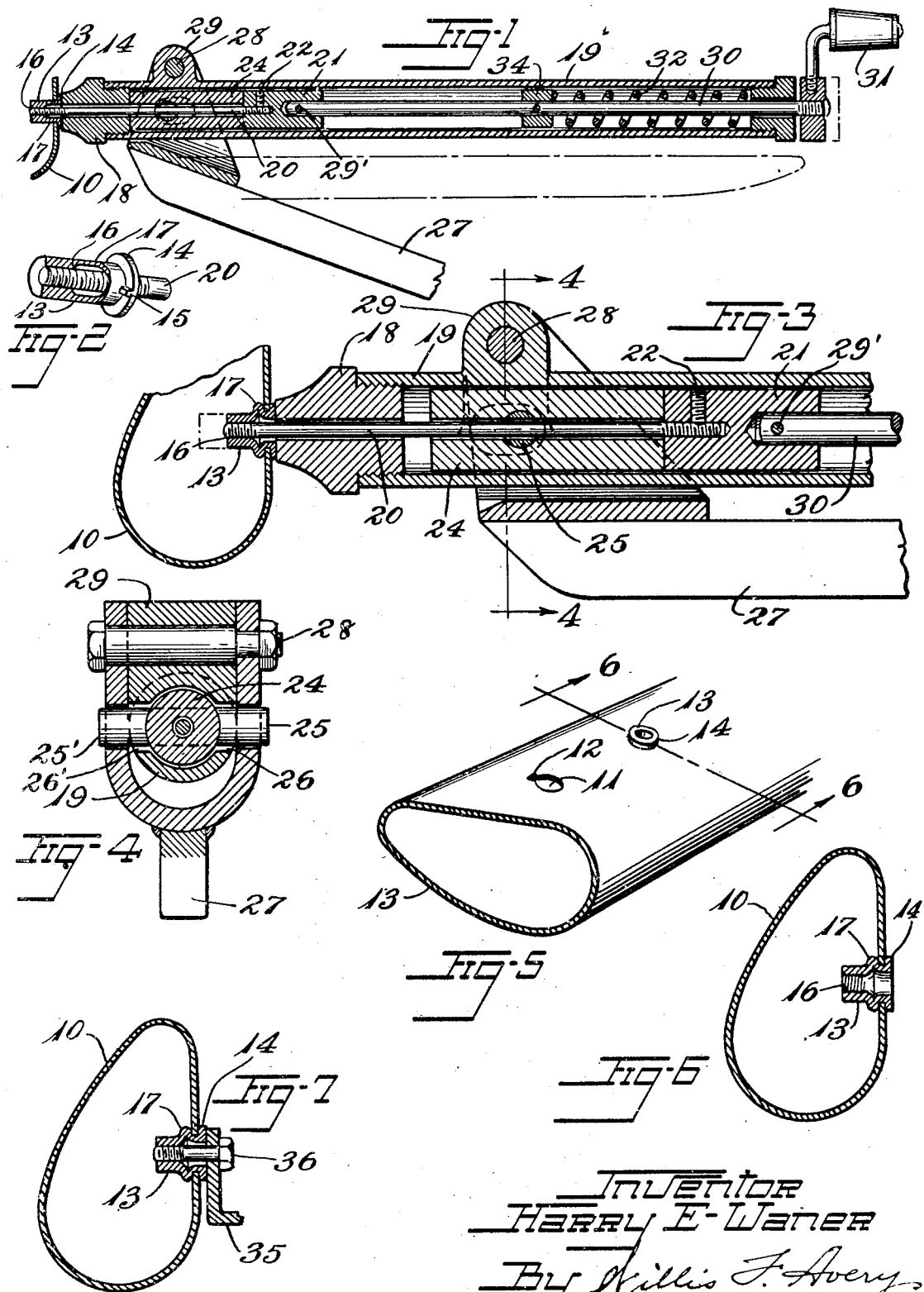
Inventor
Harry E. Waner
By Willis F. Avery
Atty Patented Feb. 28, 1939

2,149,199

UNITED STATES PATENT OFFICE 2,149,199

TUBULAR RIVET

Harry E. Waner, Akron, Ohio, assignor to The B. F. Goodrich Company, New York, N. Y., a corporation of New York Application August 13, 1936, Serial No. 95,757

5 Claims. (Cl. 85—40)

This invention relates to tubular rivets. This application is a continuation in part of my application Serial No. 30,889, filed July 11, 1935 (now Patent No. 2,069,907).

The problem of fastening articles to walls of thin sheet metal, especially where one side only of the sheet is available for operation, presents many difficulties. The thinness of the metal sheet precludes the use of threaded screws except for exceptionally light loads, and the threading of the holes requires considerable expenditure of time. On the other hand, ordinary rivets can not be applied in the absence of any means for bucking the rivets from the opposite side of the sheet. With thin metals welding becomes impractical and with certain metals such as aluminum soldering is practically impossible.

The present invention aims to provide a tubular fastening element which may be applied from one side only of the sheet.

The principal objects of the invention are to provide a novel fastening element.

Other objects will appear from the following description and the accompanying drawing.

Of the drawing:

Fig. 1 is a sectional view in elevation showing the apparatus used in the installation of one of the tubular rivets, the apparatus being shown in the position of initially inserting the rivet in an aperture in a sheet metal wall, dot and dash lines indicating the position of the handles after the rivet has been fully installed.

Fig. 2 is a perspective view partly in section of a preferred form of the tubular rivet of my invention with the threaded draw rod inserted therein.

Fig. 3 is a sectional view similar to Fig. 1, with parts broken away, showing the second step in the procedure of installing the rivet.

Fig. 4 is a section taken on line 4—4 of Fig. 3.

Fig. 5 is a perspective view of a hollow article having a thin wall prepared to receive one of the rivets and with one of the rivets in place.

Fig. 6 is a cross-sectional view thereof taken on line 6—6 of Fig. 5.

Fig. 7 is a similar view showing a bracket attached to the rivet.

Referring to the drawing the numeral 10 designates a thin wall of metal or other rigid material forming a part of a hollow article accessible only from one side, to which it is desired to fasten other parts. The numeral 11 designates an aperture therein comprising a circular opening having a key way 12 as an extension thereof. Such apertures may be formed in any desired manner to receive the tubular rivets of this invention.

The rivet 13 comprises a tubular body having a flange 14 at one end and preferably formed with an integral key 15 for engaging the key way 12 to prevent rotation of the rivet when it is in place. The opposite extremity of the rivet is threaded internally as at 16 to provide anchorage for a screw. The rivet between the threaded portion 16 and the end at the flange 14 is counterbored to reduce the wall thickness as compared with the threaded portion and provide a collapsible cylindrical portion 17, as is shown for example in Figs. 1 and 2. This construction, in which the bore of uniform diameter terminates in the threaded portion, has the advantage that the outward collapse or expansion is effected uniformly about the circumference without likelihood of a piling up of the metal at one side with deficiency at the other. The endwise pressure is applied with circumferential uniformity by virtue of the threaded connection which assures uniform pressure application entirely around the rivet by the inserted threaded member used for collapsing the rivet. The cylindrical form of the collapsible wall gives maximum material in the bulge of the expanded rivet for maximum holding strength and water-tightness of the joint.

The tubular stem of the rivet is inserted through the aperture 11 with the flange against the outer surface of the wall. The rivet may then be shortened by endwise pressure so as to collapse the portion 17 as seen in Figs. 3 and 6, thereby forming a flange on each side of the metal wall 10.

In order to accomplish such collapse of the rivet wall by operation from one side only of the wall, the apparatus employed is as follows:

A setting anvil 18, comprising a centrally bored flat ended plug, is mounted in one end of a hollow tubular barrel 19. A draw rod 20 extending through the plug 18 is threaded at one end to engage the threads in the rivet 13. Its opposite end is fixed to a draw head 21, as by being threaded therein and locked against rotation by a screw 22. Draw head 21 is loosely enclosed by the barrel 19. A tubular cross head 24, slidably mounted in the barrel between the anvil 18 and the draw head 21, is provided with trunnions 25, 25' which extend loosely through elongate slots 26, 26' formed in the barrel. A lever 27 hinged by a pin 28 to an ear 29, formed on the side of the barrel is adapted to impart a longitudinal movement to the draw rod 20, toward the anvil 19, when the lever 27 is forced toward the barrel. If the draw rod is engaged in the threads of the tubular rivet and the flanged head of the rivet is against the anvil, as shown in Fig. 1, and such movement of the lever is attempted, the portion 17 of the rivet will be collapsed as shown in Fig. 3.

In order conveniently to release the tool from the collapsed rivet, draw head 21 is attached, as by a cross pin 29', to a shaft 30, extending lengthwise through the barrel 19 and secured to a crank 31 whereby the draw rod 20 may be screwed out of the rivet.

A coil spring 32, of the compression type, extending between a plug 33, through which the shaft 30 is journaled at the handle end of the barrel 19, and a collar 34, fixed to shaft 30 within barrel 19, normally holds the draw rod in its advanced position.

When the rivet is to be inserted in a wall of metal or other thin material, the rivet is screwed onto the advanced end of the draw rod until its flanged head meets the anvil. The rivet is then inserted in the aperture 11 in the wall and while it is held with its flange thereagainst, lever 27 is operated to collapse the rivet. The crank 31 is then turned to withdraw the draw rod.

As shown in Fig. 7 a bracket 35 or other attachment may be fastened to the rivet by a screw 36 inserted in the threaded bore of the rivet.

The invention is especially useful where stay rods, De-Icer equipment, or other parts are to be fastened to the thin metal skin of aircraft. The rivets may be made of any soft metal such as aluminum or copper or their alloys.

I claim:

1. A tubular rivet adapted to be inserted in a wall aperture and to be expanded outwardly in a portion thereof to hold the rivet against the wall, said rivet comprising a continuously annular cylindrical body of substantially uniform outside diameter throughout its length and a flange at one end thereof, said body having a bore of substantially uniform diameter extending into the body from the flanged end and terminating in a threaded portion adapted to be engaged by a threaded member inserted in the bore from the flanged end of the rivet, the body between said threaded portion and the flanged end being adapted to be outwardly expanded by forces applied axially of the rivet by engagement of a threaded member with the screw threads to form a second flange at the face of the wall opposite that adjacent the said flanged end of the rivet.

2. A tubular rivet adapted to be inserted in a wall aperture and to be expanded outwardly in a portion thereof to hold the rivet against the wall, said rivet comprising a continuously annular cylindrical body of substantially uniform outside diameter throughout its length and a wall-engaging flange at one end thereof formed with a key element to seat in a recess in the wall to prevent turning of the rivet, said body having a bore of substantially uniform diameter extending into the body from the flanged end and terminating in a threaded portion adapted to be engaged by a threaded member inserted into the bore from the flanged end of the rivet, the body between said threaded portion and the flanged end being adapted to be outwardly expanded by forces applied axially of the rivet by engagement of a threaded member with the screw threads to form a second flange at the face of the wall opposite that adjacent the said flanged end of the rivet.

3. A tubular rivet adapted to be inserted in a wall aperture and to be expanded in a portion thereof to hold the rivet against the wall, said rivet comprising a continuously annular cylindrical body of substantially uniform outside diameter throughout its length and having a wall-engaging flange at one end thereof formed with a key element to engage the wall and to prevent turning of the rivet, the body including an internally threaded portion at the other end of increased wall thickness, and a collapsible wall portion between the flanged end and the threaded portion having a thinner wall adapted to be bulbed outwardly to form a second flange under pressure applied axially of the rivet, and a threaded screw member having a head at the flanged end of the rivet and a threaded portion adapted to extend into the rivet and to engage the threaded portion thereof to reinforce the rivet against forces tending to straighten the flanged portion.

4. A tubular rivet structure adapted to be inserted in a wall aperture and to be expanded in a portion thereof to hold the structure against the wall, said structure comprising a flanged end, a screw-threaded portion and a continuously annular cylindrical wall portion of substantially uniform outside diameter extending from said flanged end to said screw-threaded portion, said cylindrical wall portion being thinner and of larger bore than the wall at said screw-threaded portion and being adapted to be expanded by pressure in the axial direction applied through the screw threads of the structure.

5. A tubular rivet structure adapted to be inserted in a wall aperture and to be outwardly collapsed in a position thereof to hold the structure against the wall, said structure comprising a flanged end, a bore of substantially uniform diameter extending into the structure from the flanged end and terminating in a threaded portion of less internal diameter, said threaded portion being adapted to be engaged by a threaded member inserted from the flanged end, and a continuously annular relatively thin cylindrical wall portion defining said bore of uniform diameter adapted to be expanded by axial pressure applied through screw threads of the rivet structure.

HARRY E. WANER.